US008125930B2

(12) United States Patent  
Ouellette et al.

(10) Patent No.: US 8,125,930 B2
(45) Date of Patent: Feb. 28, 2012

(54) PROTOCOL FOR CLOCK DISTRIBUTION AND LOOP RESOLUTION

(75) Inventors: Michel Ouellette, Orleans (CA); James Aweya, Kanata (CA); Delfin Y. Montuno, Kanata (CA); Kent Felske, Kanata (CA)

(73) Assignee: Rockstar Bidco LP, New York, NY (US)

( * ) Notice: Subject to any disclaimer, the term of this patent is extended or adjusted under 35 U.S.C. 154(b) by 460 days.

(21) Appl. No.: 11/609,966

(22) Filed: Dec. 13, 2006

(65) Prior Publication Data

US 2008/0144515 A1    Jun. 19, 2008

(51) Int. Cl.
H04L 12/28 (2006.01)
(52) U.S. Cl. ......... 370/256; 370/503; 375/356; 713/400
(58) Field of Classification Search ................. 370/241, 370/242, 254, 255, 256, 351, 389, 395.1, 370/395.6, 395.61, 464, 498, 503; 340/825, 340/5.1, 5.2, 5.6, 5.61, 5.63; 713/400, 401; 714/699, 724, 738, 744; 709/238, 242, 244
See application file for complete search history.

(56) References Cited

U.S. PATENT DOCUMENTS

| | | | | |
|---|---|---|---|---|
| 5,455,956 A | * | 10/1995 | Nguyen et al. | 709/238 |
| 6,418,151 B1 | * | 7/2002 | Walter et al. | 370/503 |
| 6,714,563 B1 | * | 3/2004 | Kushi | 370/503 |
| 2004/0047300 A1 | * | 3/2004 | Enomoto et al. | 370/256 |
| 2006/0215581 A1 | * | 9/2006 | Castagnoli | 370/254 |
| 2008/0205294 A1 | * | 8/2008 | Brune et al. | 370/254 |

* cited by examiner

Primary Examiner — Seema S Rao
Assistant Examiner — Khoa Huynh
(74) Attorney, Agent, or Firm — Anderson Gorecki & Manaras LLP

(57) ABSTRACT

Algorithms and data structure are described for constructing and maintaining a clock distribution tree ("CDT") for timing loop avoidance. The CDT algorithms and data structure allows a node to make an automated and unattended path switch to the most desirable clock source in the network. In response to a network topology change, a clock root node distributes new clock paths to all nodes in the network. In particular, the root node calculates a new clock path for each affected node by building a clock source topology tree, and identifying from that tree a path to the network node from a clock source of higher or equal stratum relative to that network node. The root node then sends a network message to each node indicating the new path that the node should use. Each node receives the message and compares the new path with the existing path. If the paths are different then the node acquires the new path just received in the message. If the paths are the same then the node does nothing and discards the message.

22 Claims, 16 Drawing Sheets

|    | 1 | 2 | 3 | 4 | 5 | 6 | 7 | 8 | 9 | 10 |
|----|---|---|---|---|---|---|---|---|---|----|
| 1  | 0 | 0 | 0 | 0 | 0 | 0 | 0 | 0 | 0 | 0  |
| 2  | 0 | 0 | 0 | 0 | 0 | 0 | 0 | 0 | 0 | 0  |
| 3  | 0 | 0 | 0 | 0 | 0 | 0 | 0 | 0 | 0 | 0  |
| 4  | 0 | 0 | 0 | 0 | 0 | 0 | 0 | 0 | 0 | 0  |
| 5  | 0 | 0 | 0 | 0 | 0 | 0 | 0 | 0 | 0 | 0  |
| 6  | 0 | 0 | 0 | 0 | 0 | 0 | 0 | 0 | 0 | 0  |
| 7  | 0 | 0 | 0 | 0 | 0 | 0 | 0 | 0 | 0 | 0  |
| 8  | 0 | 0 | 0 | 0 | 0 | 0 | 0 | 0 | 0 | 0  |
| 9  | 0 | 0 | 0 | 0 | 0 | 0 | 0 | 0 | 0 | 0  |
| 10 | 0 | 0 | 0 | 0 | 0 | 0 | 0 | 0 | 0 | 0  |

Figure 2

|    | 1 | 2 | 3 | 4 | 5 | 6 | 7 | 8 | 9 | 10 |
|----|---|---|---|---|---|---|---|---|---|----|
| 1  | 0 | 1 | 1 | 1 | 0 | 1 | 0 | 0 | 0 | 0  |
| 2  | 1 | 0 | 0 | 1 | 0 | 0 | 1 | 1 | 0 | 0  |
| 3  | 1 | 0 | 0 | 1 | 1 | 0 | 0 | 0 | 0 | 0  |
| 4  | 1 | 1 | 1 | 0 | 1 | 1 | 1 | 1 | 0 | 0  |
| 5  | 0 | 0 | 1 | 1 | 0 | 0 | 0 | 0 | 0 | 0  |
| 6  | 1 | 0 | 0 | 1 | 0 | 0 | 1 | 0 | 1 | 0  |
| 7  | 0 | 1 | 0 | 1 | 0 | 1 | 0 | 0 | 1 | 1  |
| 8  | 0 | 1 | 0 | 1 | 0 | 0 | 0 | 0 | 1 | 1  |
| 9  | 0 | 0 | 0 | 0 | 0 | 1 | 1 | 1 | 0 | 1  |
| 10 | 0 | 0 | 0 | 0 | 0 | 0 | 1 | 1 | 1 | 0  |

Figure 3

|   | 1 | 2 | 3 | 4 | 5 | 6 | 7 | 8 | 9 | 10 |
|---|---|---|---|---|---|---|---|---|---|----|
| 1 | 0 | 1 | 1 | 1 | 0 | 1 | 0 | 0 | 0 | 0 |
| 2 | 0 | 0 | 0 | 1 | 0 | 0 | 1 | 1 | 0 | 0 |
| 3 | 0 | 0 | 0 | 1 | 1 | 0 | 0 | 0 | 0 | 0 |
| 4 | 0 | 1 | 1 | 0 | 1 | 1 | 1 | 1 | 0 | 0 |
| 5 | 0 | 0 | 0 | 0 | 0 | 0 | 0 | 0 | 0 | 0 |
| 6 | 0 | 0 | 0 | 0 | 0 | 0 | 1 | 0 | 1 | 0 |
| 7 | 0 | 0 | 0 | 0 | 0 | 1 | 0 | 0 | 1 | 1 |
| 8 | 0 | 0 | 0 | 0 | 0 | 0 | 0 | 0 | 1 | 1 |
| 9 | 0 | 0 | 0 | 0 | 0 | 1 | 1 | 1 | 0 | 1 |
| 10 | 0 | 0 | 0 | 0 | 0 | 0 | 1 | 1 | 1 | 0 |

Figure 4

|    | 1 | 2 | 3 | 4 | 5 | 6 | 7 | 8 | 9 | 10 |
|----|---|---|---|---|---|---|---|---|---|----|
| 1  | 0 | 1 | 1 | 1 | 0 | 1 | 0 | 0 | 0 | 0  |
| 2  | 0 | 0 | 0 | 0 | 0 | 0 | 1 | 1 | 0 | 0  |
| 3  | 0 | 0 | 0 | 0 | 1 | 0 | 0 | 0 | 0 | 0  |
| 4  | 0 | 0 | 0 | 0 | 0 | 0 | 0 | 0 | 0 | 0  |
| 5  | 0 | 0 | 0 | 0 | 0 | 0 | 0 | 0 | 0 | 0  |
| 6  | 0 | 0 | 0 | 0 | 0 | 0 | 0 | 0 | 1 | 0  |
| 7  | 0 | 0 | 0 | 0 | 0 | 0 | 0 | 0 | 0 | 1  |
| 8  | 0 | 0 | 0 | 0 | 0 | 0 | 0 | 0 | 0 | 0  |
| 9  | 0 | 0 | 0 | 0 | 0 | 0 | 0 | 0 | 0 | 0  |
| 10 | 0 | 0 | 0 | 0 | 0 | 0 | 0 | 0 | 0 | 0  |

Figure 5

|    | 1 | 2 | 3 | 4 | 5 | 6 | 7 | 8 | 9 | 10 |
|----|---|---|---|---|---|---|---|---|---|----|
| 1  | 0 | 1 | 1 | 1 | 0 | 1 | 0 | 0 | 0 | 0  |
| 2  | 0 | 0 | 0 | 1 | 0 | 0 | 1 | 1 | 0 | 0  |
| 3  | 0 | 0 | 0 | 1 | 1 | 0 | 0 | 0 | 0 | 0  |
| 4  | 0 | 1 | 1 | 0 | 1 | 1 | 1 | 1 | 0 | 0  |
| 5  | 0 | 0 | 0 | 0 | 0 | 0 | 0 | 0 | 0 | 0  |
| 6  | 0 | 0 | 0 | 0 | 0 | 0 | 1 | 0 | 1 | 0  |
| 7  | 0 | 0 | 0 | 0 | 0 | 1 | 0 | 0 | 1 | 1  |
| 8  | 0 | 0 | 0 | 0 | 0 | 0 | 0 | 0 | 1 | 1  |
| 9  | 0 | 0 | 0 | 0 | 0 | 1 | 1 | 1 | 0 | 1  |
| 10 | 0 | 0 | 0 | 0 | 0 | 0 | 1 | 1 | 1 | 0  |

Figure 7

|   | 1 | 2 | 3 | 4 | 4.5 | 5 | 6 | 7 | 8 | 9 | 10 |
|---|---|---|---|---|---|---|---|---|---|---|---|
| 1 | 0 | 1 | 1 | 1 | 1 | 0 | 1 | 0 | 0 | 0 | 0 |
| 2 | 0 | 0 | 0 | 1 | 0 | 0 | 0 | 1 | 1 | 0 | 0 |
| 3 | 0 | 0 | 0 | 1 | 0 | 1 | 0 | 0 | 0 | 0 | 0 |
| 4 | 0 | 1 | 1 | 0 | 1 | 1 | 1 | 1 | 1 | 0 | 0 |
| 4.5 | 0 | 0 | 0 | 1 | 0 | 1 | 1 | 0 | 0 | 1 | 0 |
| 5 | 0 | 0 | 0 | 0 | 0 | 0 | 0 | 0 | 0 | 0 | 0 |
| 6 | 0 | 0 | 0 | 0 | 0 | 0 | 0 | 1 | 0 | 1 | 0 |
| 7 | 0 | 0 | 0 | 0 | 0 | 0 | 1 | 0 | 0 | 1 | 1 |
| 8 | 0 | 0 | 0 | 0 | 0 | 0 | 0 | 0 | 0 | 1 | 1 |
| 9 | 0 | 0 | 0 | 0 | 0 | 0 | 1 | 1 | 1 | 0 | 1 |
| 10 | 0 | 0 | 0 | 0 | 0 | 0 | 0 | 1 | 1 | 1 | 0 |

Figure 8

|   | 1 | 2 | 3 | 4 | 4.5 | 5 | 6 | 7 | 8 | 9 | 10 |
|---|---|---|---|---|---|---|---|---|---|---|---|
| 1 | 0 | 1 | 1 | 1 | 1 | 0 | 1 | 0 | 0 | 0 | 0 |
| 2 | 0 | 0 | 0 | 0 | 0 | 0 | 0 | 1 | 1 | 0 | 0 |
| 3 | 0 | 0 | 0 | 0 | 0 | 1 | 0 | 0 | 0 | 0 | 0 |
| 4 | 0 | 0 | 0 | 0 | 0 | 0 | 0 | 0 | 0 | 0 | 0 |
| 4.5 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 |
| 6 | 0 | 0 | 0 | 0 | 0 | 0 | 0 | 0 | 0 | 1 | 0 |
| 7 | 0 | 0 | 0 | 0 | 0 | 0 | 0 | 0 | 0 | 0 | 1 |
| 8 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 |

Figure 9

PROTOCOL FOR CLOCK DISTRIBUTION AND LOOP RESOLUTION

FIELD OF THE INVENTION

This invention relates generally to the field of network communications, and more particularly to clock distribution and loop resolution.

BACKGROUND OF THE INVENTION

Timing loops are known to present a problem for distribution of timing signals in a communications network. In SONET/SDH networks, for example, network elements ("NEs") may each derive their timing from another NE. If the chain of timing derivation forms a loop which is isolated from an external reference timing source, this is a timing loop. In general, a SONET Network that has been properly configured will not suffer from a timing loop problem. However, it is sometimes difficult to avoid timing loops without sophisticated network management tools.

Although conceptually simple, timing loops tend to be insidious problems in the real world. Timing loops preclude the affected NEs from being synchronized to the primary reference clock ("PRC") and cause mysterious bit errors which are difficult to analyze and correct. The clock frequencies are traceable to an unpredictable unknown quantity, i.e., the hold-in frequency limit of one of the affected NE clocks. By design, this is bound to be well outside the expected accuracy of the clock after several days in holdover, so performance is almost certain to become severely degraded.

The importance of proper timing distribution and synchronization in a network is illustrated in the following situation. If two pieces of equipment that are synchronized to different clock sources are joined by a trunk, input buffers on the interfaces at each node periodically overflow at one end or underflow at the other end. This overflow or underflow condition is commonly known as a frame slip because an overflow condition usually causes one or more frames of data to be discarded. Clocking problems typically cause frame slips on circuit-line interfaces, especially circuit lines to TDM devices such as a PBX. Frame slips can occur on either or both ends of the line. In a TDM-based network, almost every frame slip causes data to be lost since there is likely to be data contained in at least one timeslot of every frame.

Isolating the cause of a timing loop condition is difficult for at least two reasons. One reason is that the cause is unintentional, e.g., a lack of diligence in analyzing all fault conditions, or an error in provisioning. The second reason is that there are no sync-specific alarms associated with timing loops since each affected NE accepts the situation as normal. Consequently, the network administrator must carry out trouble isolation, relying on a knowledge of the sync distribution topology and on an analysis of data on slip counts and pointer counts.

SUMMARY OF THE INVENTION

In accordance with one embodiment of the invention, in a network in which information about nodal adjacency and nodal clock quality level are available, a method for configuring and maintaining network clock distribution infrastructure comprises the steps of: selecting, from among a plurality of candidate Primary Reference Clocks (PRCs), a root node; detecting, by the root node, a network topology change; calculating a new clock distribution path for a node affected by the network topology change; and signaling, by the root node to the affected node, an indication of the new clock distribution path.

The method may be executed by constructing a clock distribution tree ("CDT") starting from a clock root node which interfaces to a primary reference clock, e.g., a Stratum 1 clock. A CDT protocol reconfigures the tree in response to detection of a topology change including network node failure, link failure, and nodes addition and removal. The protocol also recognizes multi-link trunks between network nodes and ensures that only one link in the trunk at any one time is used for timing distribution, if needed. As will be apparent from the detailed description below, the protocol can be applied to networks that distribute timing at Layer 1, i.e., Physical Layer, or higher layers of the Open System Interconnect ("OSI") model.

One advantage of the protocol is that it allows for temporarily unavailable clock sources to be automatically reinstated for clock synchronization. When a failure causes a topology change, the root node updates clock distribution paths, which can result in a change in clock source. When the failure is repaired, and the original clock source is again available, the root node updates clock distribution paths in order to utilize the original clock source.

Another advantage of the invention is that a node is able to indirectly synchronize to a remote high quality clock source. For instance, in Layer 1 timing distribution, each element (node or link) in the path is synchronized to the previous element "upstream" in the path. Thus, a node is frequency-locked to the upstream link, which is then frequency-locked to the upstream node, which is then frequency-locked to the next upstream link, and so on. This continues until the defined highest quality clock source (e.g., the root node) is reached.

BRIEF DESCRIPTION OF THE DRAWINGS

FIGS. 2 through 5 illustrate use of a matrix which represents the 10-node network of FIG. 1 to produce the clock distribution tree of FIG. 6.

FIGS. 7 through 10 illustrate adaptation to node addition.

DETAILED DESCRIPTION

Figure 1:
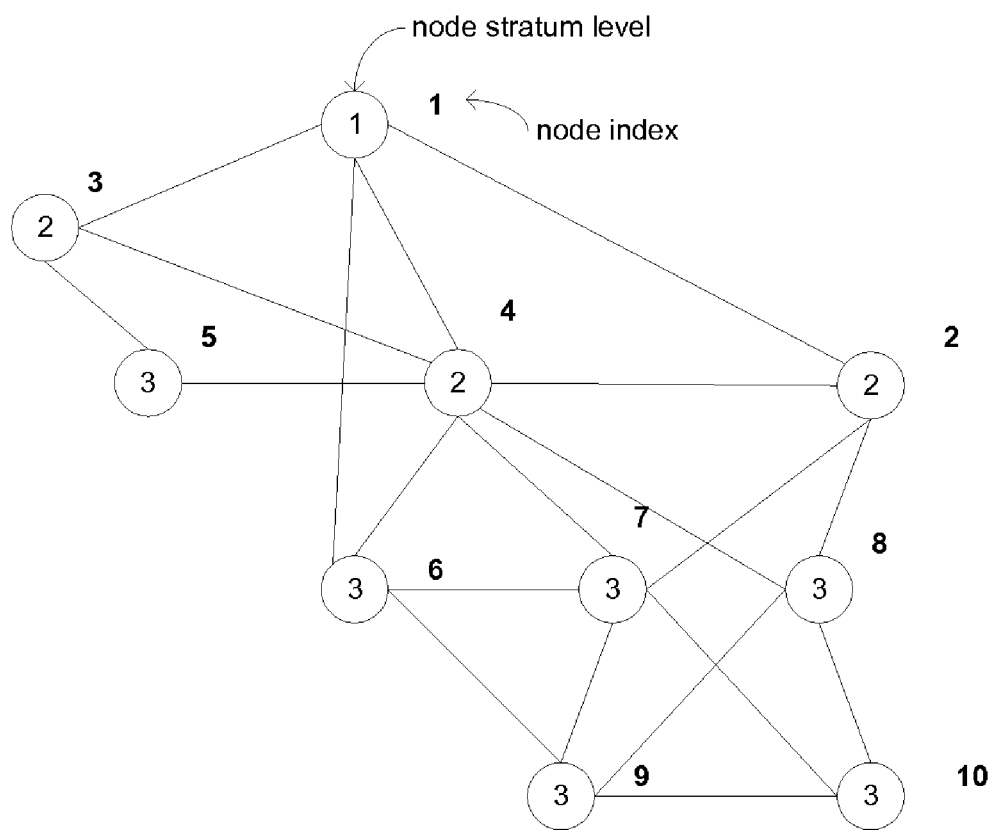
FIG. 1 illustrates an original network topology with reference to which the protocol is described.

Referring to FIGS. 1 and 2, an algorithm and data structure will be described for constructing and maintaining a clock distribution tree ("CDT") which allows each node in the network to synchronize to the highest quality, closest stratum clock source available. The CDT protocol accommodates the changes in network topology, e.g., addition or deletion of a network clock source by the network administrator, link/trunk/connection failure or repair, and clock source failure or repair. Although a mesh network architecture will be used in the illustrated example, the network could be configured in a ring architecture. The general architecture of a tree, in terms of communications networks, is well understood in the art and has no loops.

At least one clock root node (1) is selected for the network. The clock root node (1) is operative to select a reference clock source for each other node in the network. If there are multiple clock root nodes, each clock root node is associated with a unique set of nodes, i.e., a node is not simultaneously supported by multiple root nodes. For a given node, the clock root node identifies the path to a higher or equal stratum clock source relative to that node. Within the constraints of equal or higher stratum, the clock source may also be selected based on proximity (shortest hop) and highest-available quality stratum clock source relative to that node. The clock root node also instructs other nodes to perform any needed switching of clock source references in response to network changes such as those listed above. Where there are multiple root nodes, the network administrator can define each clock root node source as primary, secondary, or tertiary clock source. The designation of a clock source as primary, secondary, or tertiary is at the discretion of the network administrator, however, the best available clock sources in terms of quality should typically be defined as primary, with other clock sources defined as secondary or tertiary. It should be appreciated that it may sometimes be unavoidable to have multiple root clocks in a network, e.g., a GPS and a clock source provided by a national or international carrier. In some cases, it is unavoidable for certain nodes and trunks in a network to synchronize to one clock source and to synchronize other nodes and trunks in the network to another clock source. This is especially common in international networks or in networks in which trunks are obtained from a variety of service providers. Such a network is synchronized in a plesiochronous fashion.

In order to execute the CDT protocol for the illustrated 10-node network, an empty 10×10 matrix is generated by the clock root node as illustrated in FIG. 2. The matrix is initialized with nodal indices sorted in non-descending order based on node stratum hierarchy property. Node adjacency information is then entered based on connectivity, where $m_{ij}=1$ means that $node_i$ is connected to $node_j$ and $m_{ij}=0$ means that $node_i$ and $node_j$ are not connected. Although a multi-link trunk between two nodes can easily be accommodated as described later, only single connectivity is used here for ease of illustration. In addition, without loss of generality, the illustrative example only considers network with only one node with stratum 1 clock. As will be evident later, a loss of a node with stratum 1 clock is easily replaced by an insertion of a new node with stratum 1 clock. The shaded area denotes the connectivity violating stratum hierarchy constraints. An assumption is made that the "row nodes" $node_i$ are "sources" and "column nodes" $node_j$ are "sinks". A stratum violation occurs if the stratum level (number) of $node_i$ (source) is greater than the stratum level of $node_j$ (sink). As specifically illustrated in FIG. 3, for example, a node with a Stratum 3 clock must not be a clock source for a node with a Stratum 2 clock. The next step is to remove the connectivity violating stratum hierarchy constraint to produce a "source eligibility matrix." There should be at least one "1" for each column (sink). Otherwise, there is no source clock for the destination node located at the empty column. Referring to FIG. 4, the shaded area indicates presence and absence of alternate clock source satisfying stratum hierarchy constraint. Referring to FIG. 5, for each destination node down along each column except column 1 which stores the root node, the first node on the row containing a "1" is selected as the clock source. The resulting CDT is shown in 6.

The clock root node may utilize a clock distribution topology creating matrix algorithm to create the clock distribution topology. An exemplary algorithm takes as input a "network connectivity matrix" with node indices sorted in non-descending order based on the stratum level and outputs "clock distribution topology matrix" and "clock connection eligibility matrix." In particular, the input is a clock network topology given by an N×N matrix, where N is the number of nodes in the network and an entry:

$$a_{ij} = \begin{cases} 1, & \text{if } node_i \text{ is adjacent to } node_j \\ 0, & \text{if } node_i \text{ is not adjacent to } node_j \end{cases},$$

where Clock_level($node_i$): is the clock stratum level of $node_i$. An assumption is made that Clock_level($node_i$)≤Clock_level($node_j$) for i<j. The resulting output includes a clock distribution topology matrix and an eligibility matrix. In particular, the clock distribution topology matrix is an N×N matrix, where an entry $$c_{ij} = \begin{cases} 1, & \text{if } node_i \text{ is the clock source for } node_j \\ 0, & \text{if } node_i \text{ is not a clock source for } node_j \end{cases}, \text{ and}$$

$$\sum_i c_{ij} = 1 \text{ for } 1 < j \le N \text{ and } \sum_{i,j} c_{ij} = N - 1.$$

Further, the eligibility matrix describes the connectivity choices satisfying clock stratum level constraints. The next step is to initialize the eligibility matrix and the clock matrix with the adjacency matrix as follows: $e_{ij}=c_{ij}=a_{ij}$ for $1 \le i \le N$, $1 \le j \le N$. Next, the eligibility matrix is determined in view of the adjacency matrix as follows: for each column, $1 \le j \le N$ set $e_{ij}=c_{ij}=0$, for $j+1 \le i \le N$ if clock_level($node_j$)<clock_level($node_i$). The next step is to determine the clock distribution topology matrix, given the eligibility matrix: for the first column j=1, set $c_{ij}=0$, for $j+1 \le i \le N$. Then, for each column $1 \le j \le N$, the minimum i is found such that $c_{kj}=0$, for $1 \le k \le i-1$ and $c_{ij}=1$ and set $c_{kj}=0$, for $i+1 \le k \le N$. Finally, the eligibility matrix is updated in accordance with $e_{ij}=\max(0, e_{ij}-c_{ij})$, for $1 \le i \le N$, $1 \le j \le N$.

The clock root node may also utilize a clock distribution topology creating matrix algorithm to recover from failure. An exemplary algorithm takes as input a "clock distribution topology matrix" and either a node or link failure, and outputs a recovered "clock distribution topology matrix." In particular, the input includes a clock network topology given by an N×N matrix, where an entry $$c_{ij} = \begin{cases} 1, & \text{if } node_i \text{ is the clock source for } node_j \\ 0, & \text{if } node_i \text{ is not a clock source for } node_j \end{cases}, \text{ and}$$

$$\sum_i c_{ij} = 1 \text{ for } 1 < j \le N \text{ and } \sum_{i,j} c_{ij} = N - 1;$$

and clock connection eligibility matrix satisfying clock stratum level constraints; and $node_k$ fails or link between $node_k$ and $node_m$ fails. An assumption is made that Clock_level($node_i$)≤Clock_level($node_j$) for i<j. The output includes a clock network topology given by an N'×N' matrix, where an entry $$c_{ij} = \begin{cases} 1, & \text{if } node_i \text{ is the clock source for } node_j \\ 0, & \text{if } node_i \text{ is not a clock source for } node_j \end{cases}, \text{ and}$$

$$\sum_i c_{ij} = 1 \text{ for } 1 < j \leq N' \text{ and } \sum_{i,j} c_{ij} = N' - 1,$$

where N'=N, if it is a single link failure and N'=N−1, if it is a single node failure, assuming a solution exists. However, a link failure is treated differently than a node failure. In particular, in the case of link failure then: (a) assume k<m and set $c_{km}=0$; (b) find $e_{im}=1$, fork+1≦i≦N in the eligibility matrix; (c) if such i found, set $c_{im}=1$ in the clock distribution topology matrix and set $e_{im}=0$; (d) else no solution found!; and (e) exit algorithm. Alternatively, if node failure then: (a) clear the link from $node_k$ to all $node_m$ in eligibility matrix and clock distribution topology matrix; (b) if $node_k$ is an internal node, clear all the links to $node_k$ in eligibility matrix and clock distribution topology matrix; and (c) for each $node_n$ previously connected to $node_k$ in the clock distribution topology matrix, and (i) find minimum i such that $e_{km}=0$, for 1≦k≦i−1 and $e_{im}=1$ and set $c_{im}=1$; and (ii) update eligibility matrix $e_{ij}$=max(0, $e_{ij}-c_{im}$), for 1≦i≦N', 1≦j≦N'.

Figure 6:
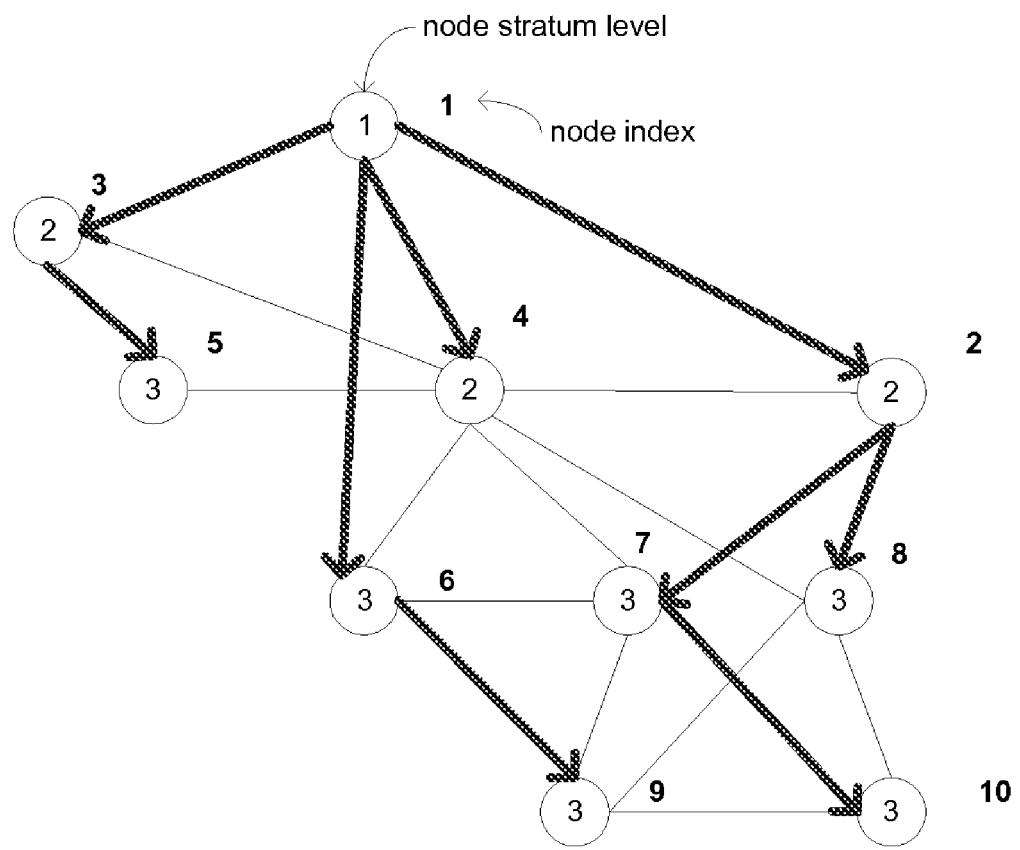
Figure 10:
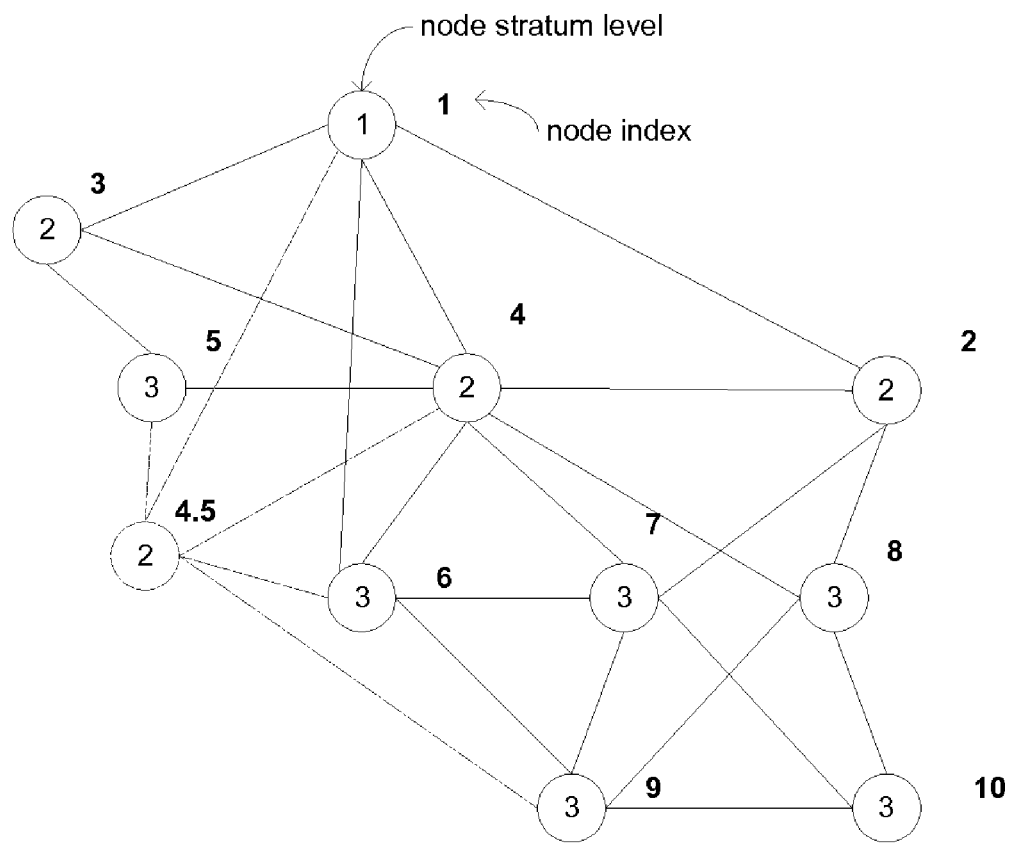
Figure 11:
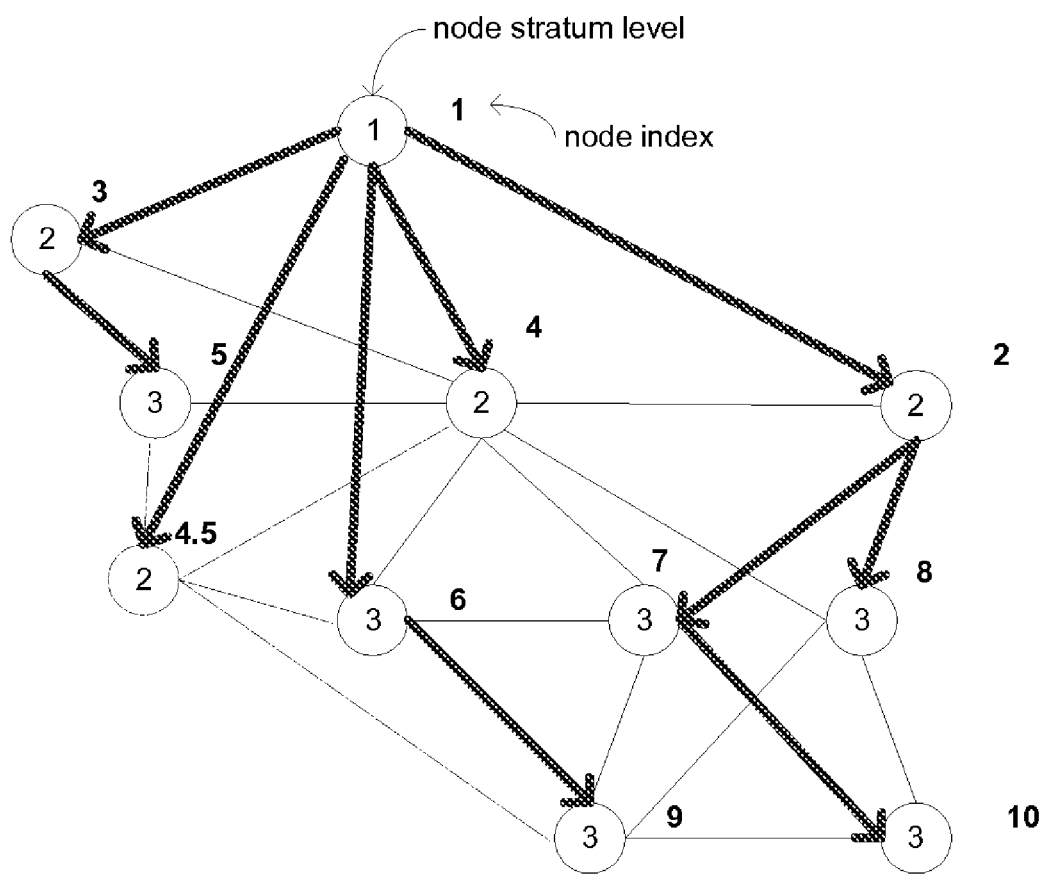
FIG. 11 illustrates the tree structure resulting from the addition of a new node relative to FIG. 10.

FIGS. 7 through 10 illustrate adaptation to node addition. In the specifically illustrated example, node (4.5) is added to the topology of FIG. 6 (See FIG. 10). FIG. 7 illustrates the "old clock eligibility matrix," and FIG. 8 illustrates the "new clock eligibility matrix." FIG. 9 illustrates the "new clock distribution topology matrix." The resulting CDT from the addition of the new node addition is illustrated in FIG. 10, and FIG. 11 depicts the tree structure.

Figure 12:
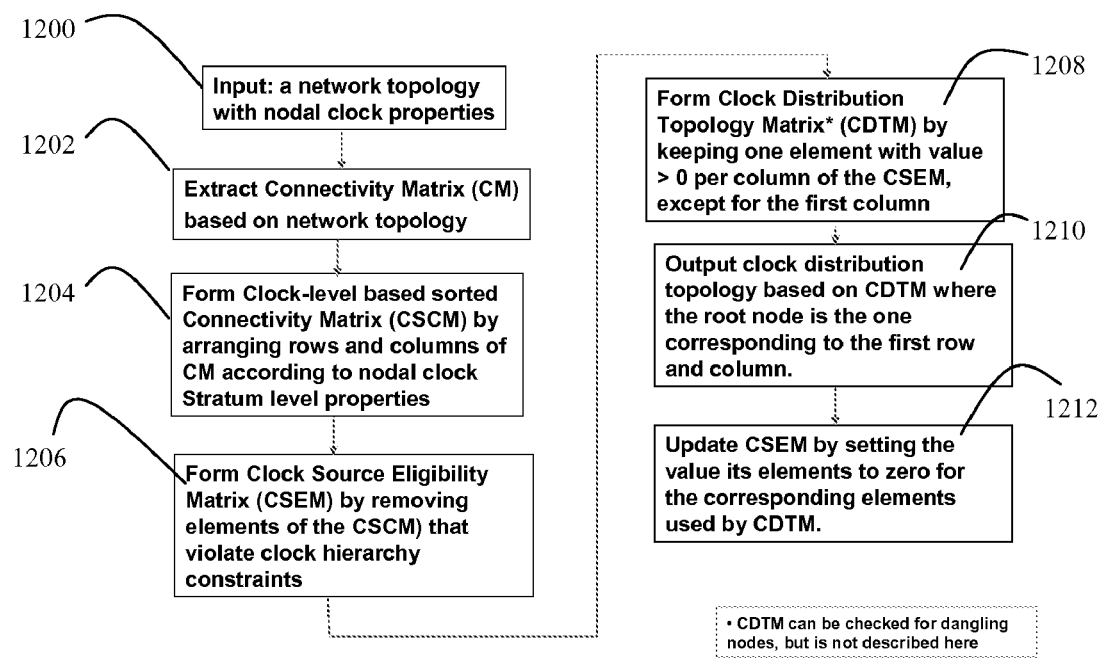
FIG. 12 illustrates CDT creation.

Operation of the CDT protocol will be more generally described with reference to the flowcharts of FIGS. 12 through 16. FIG. 12 specifically illustrates CDT creation. As shown in step (1200), network topology with nodal clock properties are input. A connectivity matrix ("CM") is generated based on network topology, as shown by step (1202). In step (1204) the protocol forms a clock-level based, sorted connectivity matrix ("CSCM") by arranging rows and columns of CM according to nodal clock stratum level properties. A clock source eligibility matrix ("CSEM") is formed by removing elements of the CSCM that violate clock hierarchy constraints, as shown by step (1206). A clock distribution topology matrix ("CDTM") is then formed by keeping one element per column of the CSEM with value>0, except for the first column, as shown in step (1208). The clock distribution topology is then output based on CDTM, where the root node is the one corresponding to the first row and column, as shown by step (1210). The CSEM is then updated by setting the value of its elements to 0 for the corresponding elements used by the CDTM, as shown by step (1212).

Figure 13:
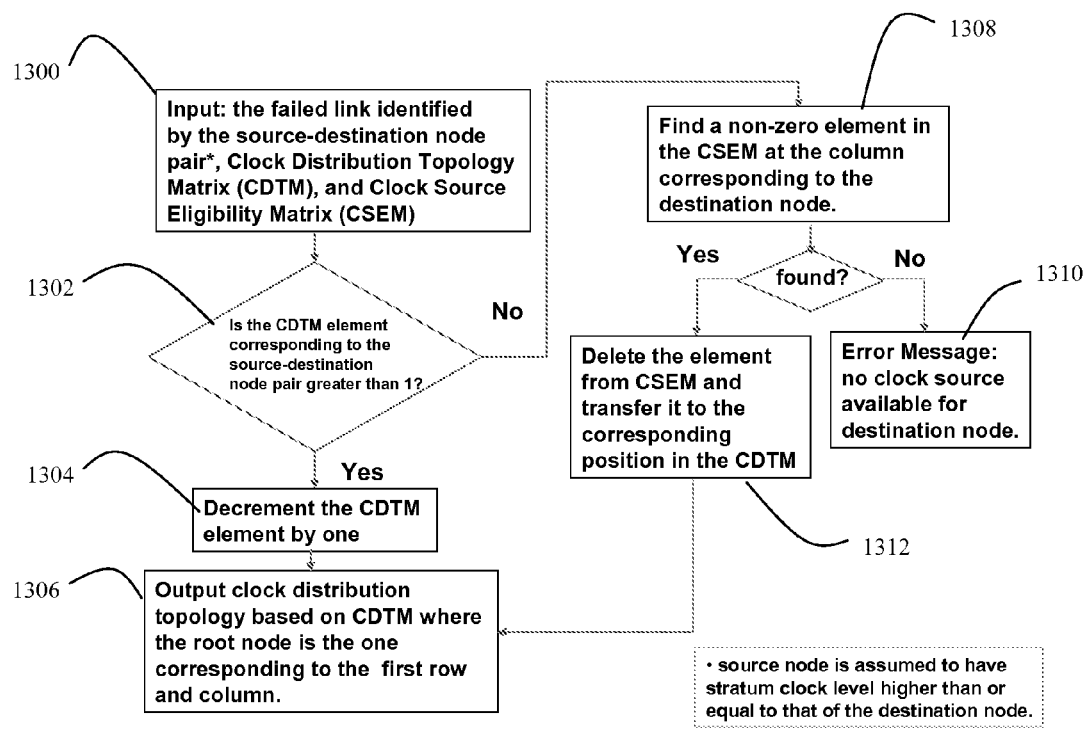
FIG. 13 illustrates adaptation to a link failure.

FIG. 13 illustrates adaptation to a link failure. As shown in step (1300), the failed link identified by the source-destination node pair, CDTM, and CSEM are input. Flow then diverges depending on whether the CDTM element corresponding to the source-destination node pair is greater than 1, as determined in step (1302). If the result of step (1302) is a "yes" determination then the CDTM element is decremented by one, as shown in step (1304). The next step (1306) is to output the clock distribution policy based on CDTM where the root node is the one corresponding to the first row and column. If the result of step (1302) is a "no" determination then the next step (1308) is to find a non-zero element in the CSEM at the column corresponding to the destination node. If such an element cannot be found, an error message is produced as shown by step (1310). Provided the element is found, the next step (1312) is to delete the element from CSEM and transfer it to the corresponding position in the CDTM. Flow then moves from step (1312) to step (1306), described above.

Figure 14:
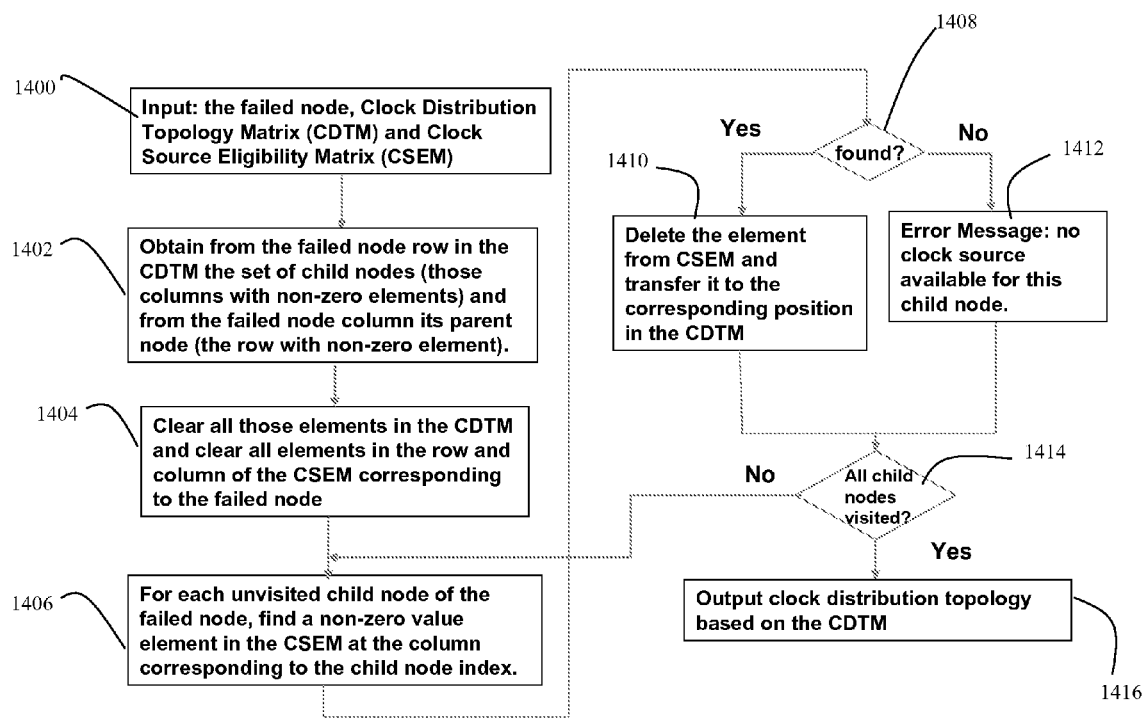
FIG. 14 illustrates adaptation to a node failure.

FIG. 14 illustrates adaptation to a node failure. The input, as shown by step (1400) is the failed node, CDTM and CSEM. In step (1402) the clock root node obtains, from the failed node row in the CDTM, the set of child nodes and from the failed node column its parent node. The next step (1404) is to clear all those elements in the CDTM and clear all elements in the row and column of the CSEM corresponding to the failed node. Then, as shown in step (1406), for each unvisited child node, find a non-zero value element in the CSEM at the column corresponding to the child node index. If the element is found, as determined in step (1408), then the element is deleted from the CSEM and transferred to the corresponding position in the CDTM as shown in step (1410). If the element is not found, an error message is generated as shown in step (1412). If not all child nodes have been visited, as determined at step (1414), then flow returns to step (1406). Otherwise, the clock distribution topology based on the CDTM is output as shown in step (1416).

Figure 15:
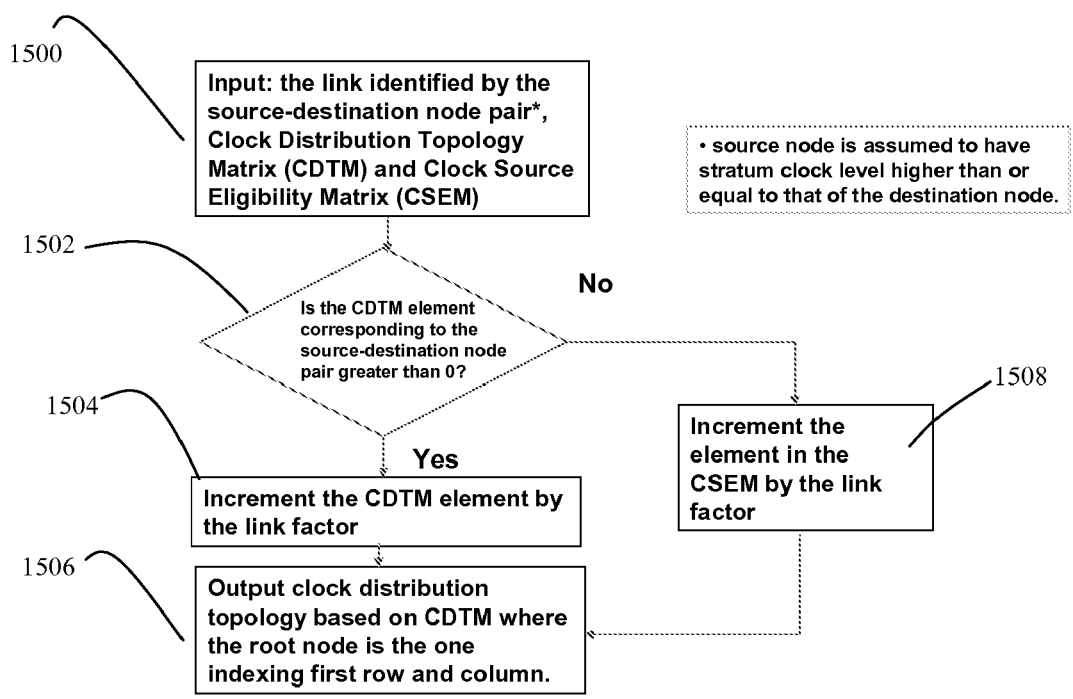
FIG. 15 illustrates adaptation to addition of a new link.

FIG. 15 illustrates adaptation to addition of a new link. The input, as shown by step (1500) is the link identified by the source-destination pair, CDTM and CSEM. If the CDTM element corresponding to the source-destination node pair is greater than zero, as determined in step (1502), then the CDTM element is incremented by the link factor as shown in step (1504). The clock distribution topology is then output based on CDTM, where the root node is the one indexing first row and column, as shown by step (1506). If the CDTM element corresponding to the source-destination node pair is not greater than zero, as determined in step (1502), then the element in the CSEM is incremented by the link factor as shown by step (1508).

Figure 16:
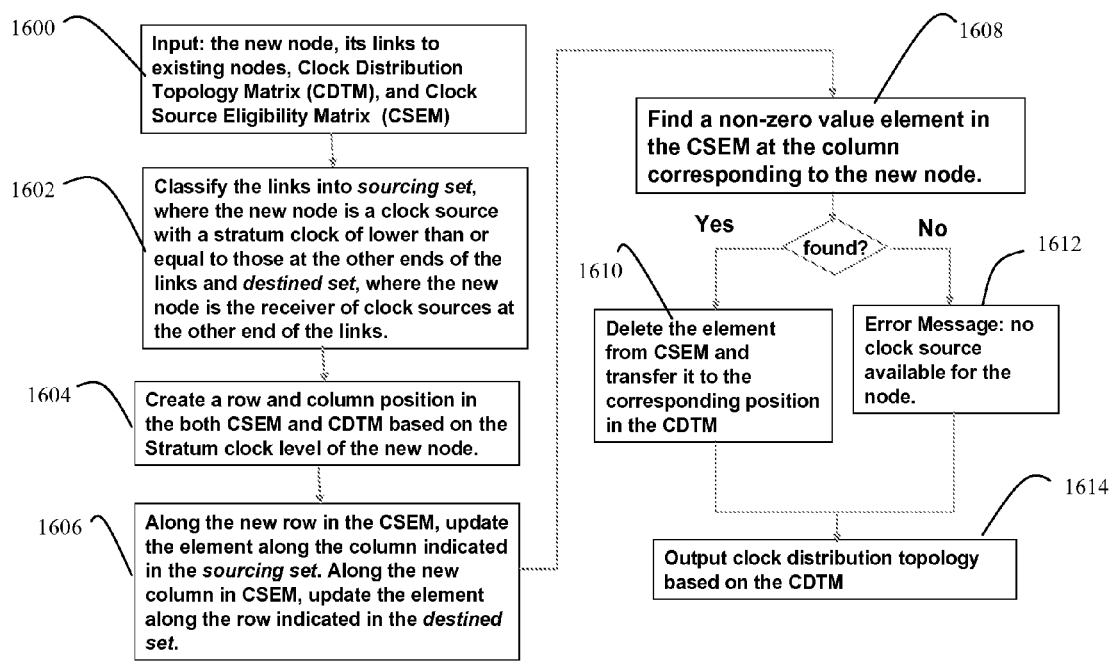
FIG. 16 illustrates adaptation to addition of a new node.

FIG. 16 illustrates adaptation to addition of a new node. As shown by step (1600), the input is the new node, its links to existing nodes, CDTM, and CSEM. The next step (1602) is to classify the links into sourcing set, where the new node is a clock source with a stratum clock level of lower than or equal to those at the other ends of the links and destined set, where the new node is the receiver of the clock sources at the other end of the links. The next step (1604) is to create a row and column position in both the CSEM and the CDTM based on the stratum clock level of the new node. Then, as shown in step (1606), along the new row in the CSEM, the element along the column in the sourcing set is updated. Also, along the new column in the CSEM, the element along the row indicated in the destined set is updated. The next step (1608) is to find a non-zero value element in the CSEM at the column corresponding to the new node. If the element can be found, then the next step (1610) is to delete the element from the CSEM and transfer it to the corresponding position in the CDTM. If the element cannot be found, then the next step (1612) is to generate an error message. In either case, i.e., via either step (1610) or step (1612), flow continues to step (1614) where the clock distribution topology based on the CDTM is output.

The flowcharts in FIGS. 12 through 16 describe the CDT algorithm when a network has only one root clock node. However, the algorithms can be extended for network scenarios with multiple clock sources. Designation of the clock type depends on the stratum (or stability) of the clock source. In a large network, for example, all stratum 2 clocks could be designated as "primary," all stratum 3 clocks as "secondary," and all stratum 4 clocks as "tertiary." The network regards all primary clocks as equal in the network clocking hierarchy, regards all secondary clocks as equal, and regards all tertiary clocks as equal.

In an alternative embodiment the CDT protocol is extended such that each node synchronizes to the highest quality stratum clock source that is available. If multiple, equal clock sources are available, the node synchronizes to the source that is physically the closest. If none of the sources is available, the network synchronizes to the internal oscillator of one of the nodes in the network.

In another embodiment the CDT is extended such that each node uses the nearest, highest-priority (primary, secondary, tertiary, or internal) clock source available to it. If there is only one primary clock source defined in the network, then all nodes synchronize to it, if possible. Otherwise, various actions may be specified. For example, if there is more than one primary clock source defined in the network, then each node synchronizes to the nearest (measured by hop count) primary source. If there are no primary clock sources defined (or all are failed), then each node synchronizes to the nearest secondary clock source. If there are no primary or secondary clock sources defined (or all are failed), then each node synchronizes to the nearest tertiary clock source. If there are no primary, secondary, or tertiary clock sources defined (or all are failed), then each node synchronizes to its own internal clock source.

Timing distribution at Layer 2 and higher differs. Clock signals are passed between nodes as discrete clock signal messages or clock signal packets. If a node is not the intended recipient of a clock signal message, i.e., it is not the clock signal message sink, it propagates the clock signal message. Clock nodes (or sources) in this case refer only to nodes that generate or sink clock signal messages; all other nodes between the clock nodes are simply transparent to the timing distribution process. The network administrator must know a priori which nodes in the network are clock nodes and which links, trunks or connection are clocked or pass clock signal messages. For Layer 1 timing distribution, there may be links that are not configured to pass timing to adjacent nodes. This may happen because timing transfer is either not support or enabled on these links. In this case, the root node has to identify the clocking nodes interconnected by these so-called no-clocked links as non-adjacent, that is, they do not exchange timing signals. In other words, the two physically adjacent clock nodes are logically non-adjacent from a timing transfer point of view. Clock nodes or links that are intentionally taken out of service by the network administrator are treated the same way by the root node as failure events.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. In a network in which information about nodal adjacency and nodal clock quality level are available, a method for configuring and maintaining network clock distribution infrastructure comprising the steps of:
   selecting, from among a plurality of candidate Primary Reference Clocks (PRCs), a root node;
   creating, by the root node, an eligibility matrix of elements that do not violate clock sourcing hierarchy constraints;
   deriving, by the root node, a clock distribution tree topology indicative of clock sourcing for a plurality of nodes from the eligibility matrix;
   detecting, by the root node, a network topology change;
   calculating, by the root node, a new clock distribution path for a node affected by the network topology change, the calculating step being based at least in-part on the clock distribution tree topology; and
   signaling, by the root node to the affected node, an indication of the new clock distribution path.

2. The method of claim 1 further including calculating the new clock distribution path by identifying, from the clock distribution tree, a path to the affected node from a clock source of higher or equal stratum relative to the affected node.

3. The method of claim 2 further including building a spanning tree with paths from the root to leaves and intermediate nodes with clock levels satisfying clock sourcing constraints.

4. The method of claim 3 further including communicating, by neighboring nodes in the spanning tree, indications of link availability and clock quality.

5. The method of claim 1 further including, in response to the signaling, the affected node comparing the new clock distribution path with a current clock distribution path and, if the new path differs from the current path, adopting the new path.

6. The method of claim 5 further including, following repair, reverting to the current path.

7. The method of claim 1 wherein the topology change includes at least one of link failure and node failure.

8. The method of claim 1 wherein the topology change includes at least one of link addition and node addition.

9. The method of claim 1 wherein the topology change includes clock quality degradation.

10. The method of claim 1 further including updating clock distribution infrastructure to incorporate new additions.

11. The method of claim 1 further including maintaining necessary data structure to capture clock distribution topology, failure conditions, and redundant clock source adjacency info.

12. In a network in which information about nodal adjacency and nodal clock quality level are available, a root node for configuring and maintaining network clock distribution infrastructure comprising:
   circuitry which creates an eligibility matrix of elements that do not violate clock sourcing hierarchy constraints;
   circuitry which derives a clock distribution tree topology indicative of clock sourcing for a plurality of nodes from the eligibility matrix;
   circuitry which detects a network topology change;
   circuitry which calculates, based at least in-part on the clock distribution tree topology, a new clock distribution path for a node affected by the network topology change; and
   a transmitter which signals, by the root node to the affected node, an indication of the new clock distribution path.

13. The root node of claim 12 further including circuitry which calculates the new clock distribution path by identifying, from the clock distribution tree, a path to the affected node from a clock source of higher or equal stratum relative to the affected node.

14. The root node of claim 12 further including circuitry which builds a spanning tree with paths from the root to leaves and intermediate nodes with clock levels satisfying clock sourcing constraints.

15. The root node of claim 14 further including circuitry which prompts communication, by neighboring nodes in the spanning tree, of indications of link availability and clock quality.

16. The root node of claim 12 further including circuitry which prompts the affected node to comparing the new clock distribution path with a current clock distribution path and, if the new path differs from the current path, adopting the new path.

17. The root node of claim 16 further including circuitry which prompts reversion to the current path following repair.

18. The root node of claim 12 wherein the topology change includes at least one of link failure and node failure.

19. The root node of claim 12 wherein the topology change includes at least one of link addition and node addition.

20. The root node of claim 12 wherein the topology change includes clock quality degradation.

21. The root node of claim 12 further including circuitry which updates clock distribution infrastructure to incorporate new additions.

22. The root node of claim 12 further including circuitry which maintains necessary data structure to capture clock distribution topology, failure conditions, and redundant clock source adjacency info.

* * * * *